(12) United States Patent
Azzopardi et al.

(10) Patent No.: US 6,260,719 B1
(45) Date of Patent: *Jul. 17, 2001

(54) METHOD FOR CONVERTING PRE-EXISTING RACKING SYSTEMS TO DUAL PALLET, VEHICLE LOADABLE RACKING SYSTEM

(76) Inventors: Michael J. Azzopardi, 564 River Rd.; John W. Skelton, 14174 Reservation Rd., both of Salinas, CA (US) 93908; James E. Gnesa, 19680 Pinehurst La., Salinas, CA (US) 93906; Gordon G. Zook, 77 Pine Canyon Rd., Salinas, CA (US) 93908; John N. Terry, 7 Maeve Ct., Scotts Valley, CA (US) 95066

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,541
(22) Filed: Jun. 8, 1998
(51) Int. Cl.[7] .................................................. A47F 5/00
(52) U.S. Cl. ..................... 211/189; 211/191; 211/193
(58) Field of Search ................................. 211/193, 191, 211/175, 189

(56) References Cited

U.S. PATENT DOCUMENTS

| | | | |
|---|---|---|---|
| 2,971,658 | 2/1961 | D'Altrui | 211/147 |
| 3,144,944 * | 8/1964 | McCnnell | 211/192 X |
| 3,212,648 * | 10/1965 | Baker, Jr. et al. | 211/193 X |
| 3,323,655 | 6/1967 | Foran | 211/134 |
| 3,337,061 | 8/1967 | Caudell | 211/134 |
| 3,556,310 | 1/1971 | Loukotsky | 211/117 |
| 3,602,373 * | 8/1971 | Cassel | 211/191 X |
| 3,602,374 * | 8/1971 | Alabaster | 211/193 X |
| 3,695,456 * | 10/1972 | Lewis | 211/191 X |
| 3,785,502 | 1/1974 | Konstant | 211/134 |
| 4,064,996 * | 12/1977 | Shillum | 211/191 |
| 4,117,938 | 10/1978 | Klein | 211/191 |
| 4,136,785 | 1/1979 | McDevitt | 211/190 |
| 4,396,125 * | 8/1983 | Rowader | 211/193 |
| 4,403,886 * | 9/1983 | Haeusler | 211/189 X |
| 4,444,323 | 4/1984 | Travis | 211/193 |
| 4,541,344 | 9/1985 | Nichols | 108/108 |
| 4,640,657 | 2/1987 | Moore | 414/347 |
| 4,796,349 * | 1/1989 | Miller | 29/402.08 |
| 4,846,627 | 7/1989 | Steuart | 414/786 |
| 4,900,219 | 2/1990 | Azzopardi | 414/786 |
| 4,955,489 * | 9/1990 | Allen | 211/162 X |
| 4,955,490 | 9/1990 | Schafer | 211/187 |
| 5,108,141 * | 4/1992 | Anderson | 211/189 X |
| 5,161,701 * | 11/1992 | Berny | 211/193 |
| 5,181,815 * | 1/1993 | Haberkorn | 211/189 X |
| 5,273,170 | 12/1993 | Azzopardi | 211/189 |
| 5,316,157 * | 5/1994 | Konstant | 211/191 X |
| 5,350,074 * | 9/1994 | Rosenband | 211/191 X |
| 5,650,210 * | 7/1997 | Fuji et al. | 428/57 |

* cited by examiner

*Primary Examiner*—Daniel P. Stodola
*Assistant Examiner*—Khoa Tran
(74) *Attorney, Agent, or Firm*—Finley & Berg, L.L.P.

(57) ABSTRACT

A method for converting an existing racking system into a double pallet vehicle-loadable racking system. A plurality of primary upright posts are isolated from the pre-existing racking system, and are each bound to a secondary upright post to form a plurality of bound upright posts. These bound upright posts are formed into a grid having at least one row and at least two columns. A cantilevered support is attached to each interior side edge of each column. The grid and the support arms are configured such that pairs of palletized cartons may be stored on or under the cantilevered supports and a lift truck can pass its body underneath the cantilevered supports and its extendable mast between any two opposing cantilevered supports.

15 Claims, 7 Drawing Sheets

METHOD FOR CONVERTING PRE-EXISTING RACKING SYSTEMS TO DUAL PALLET, VEHICLE LOADABLE RACKING SYSTEM

FIELD OF THE INVENTION

This invention relates to methods for converting a pre-existing racking system into an improved racking system.

BACKGROUND OF THE INVENTION

Pallets serve as an efficient means for storing and transporting goods, and are commonly used in many industries. For example, food products at a harvest site are typically packed into cartons which are loaded onto pallets and transported to a storage facility. Because the items packed onto a pallet must remain stable in transition, the height of the materials placed on such pallets is limited. If pallets are stored by simply placing them on the floor of the storage facility, the space above the pallet is wasted.

Accordingly, a variety of racking systems have been developed which provide vertical multi-level shelving of pallets in order to store large numbers of pallets in a space-efficient manner. Steady improvements in this field have produced new racking systems offering improved space management, customization for vehicle loading and/or loading of multiple pallets simultaneously, and structural support sufficient to meet the highest earthquake safety standards. Replacing an older pallet storage system with a new pallet racking system allows a business to reap these benefits.

However, many businesses have a substantial investment placed in their existing racking systems. Purchasing new materials to supplant an existing racking system may not be cost effective despite the benefits of an improved system. Further, environmental concerns dictate that simply discarding existing racking materials is wasteful.

Consequently, a need exists for a method by which businesses may take advantage of improvements to the art of racking systems without going to the expense of replacing their existing systems and without waste.

SUMMARY OF THE INVENTION

The present invention fulfills this need by providing a method for converting a pre-existing racking system into a double pallet, vehicle-loadable racking system, essentially comprising the following steps. A plurality of primary upright posts are isolated from the pre-existing racking system. Each primary upright post is bound to a secondary upright post to form a plurality of bound upright posts. These bound upright posts are formed into a grid having at least one row and at least two columns. Each two successive bound upright posts of each row are spaced apart sufficiently to accommodate the entrance of the body of a lift truck and placement of a pair of palletized cartons therebetween. The grid defines at least one interior side edge for each said column.

A cantilevered support means having an upper surface and an outer edge is attached to each interior side edge of each column, such that the outer edges of any two opposing cantilevered support means are laterally separated from each other sufficiently to accommodate the entrance of the extendable mast of the lift truck therebetween, sufficient space is left below each cantilevered support means to allow passage of the body of the lift truck and placement of one of the palletized cartons thereunder, and the upper surfaces of any two opposing cantilevered support means are coplanar.

A primary object of the current invention is to allow users to construct a double pallet vehicle-loadable racking system at a low cost.

Another object of the current invention is to allow users to convert to the use of a more efficient pallet racking system without wasting existing racking materials.

A further object of the current invention is to provide a method for converting a pre-existing racking system into a double pallet vehicle-loadable racking system in an uncomplicated and time-efficient manner.

Other objects and advantages of the current invention will become apparent when the method of the present invention is considered in conjunction with the accompanying drawings, specification, and claims.

DESCRIPTION OF THE PREFERRED EMBODIMENT

Figure 1:
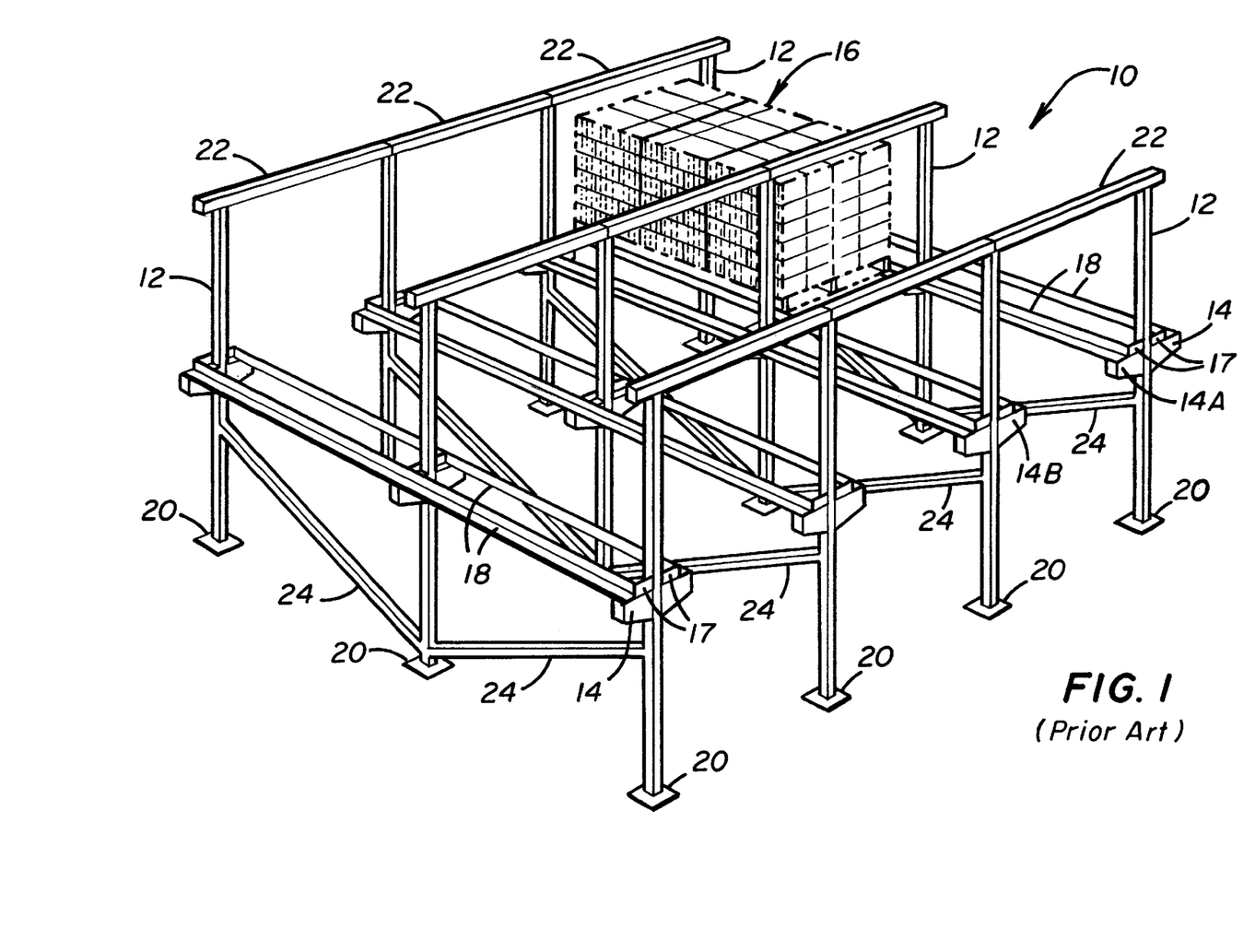
FIG. 1 is a perspective view of a single-pallet racking system with a pallet stored in a rear middle storage compartment.
Figure 2:
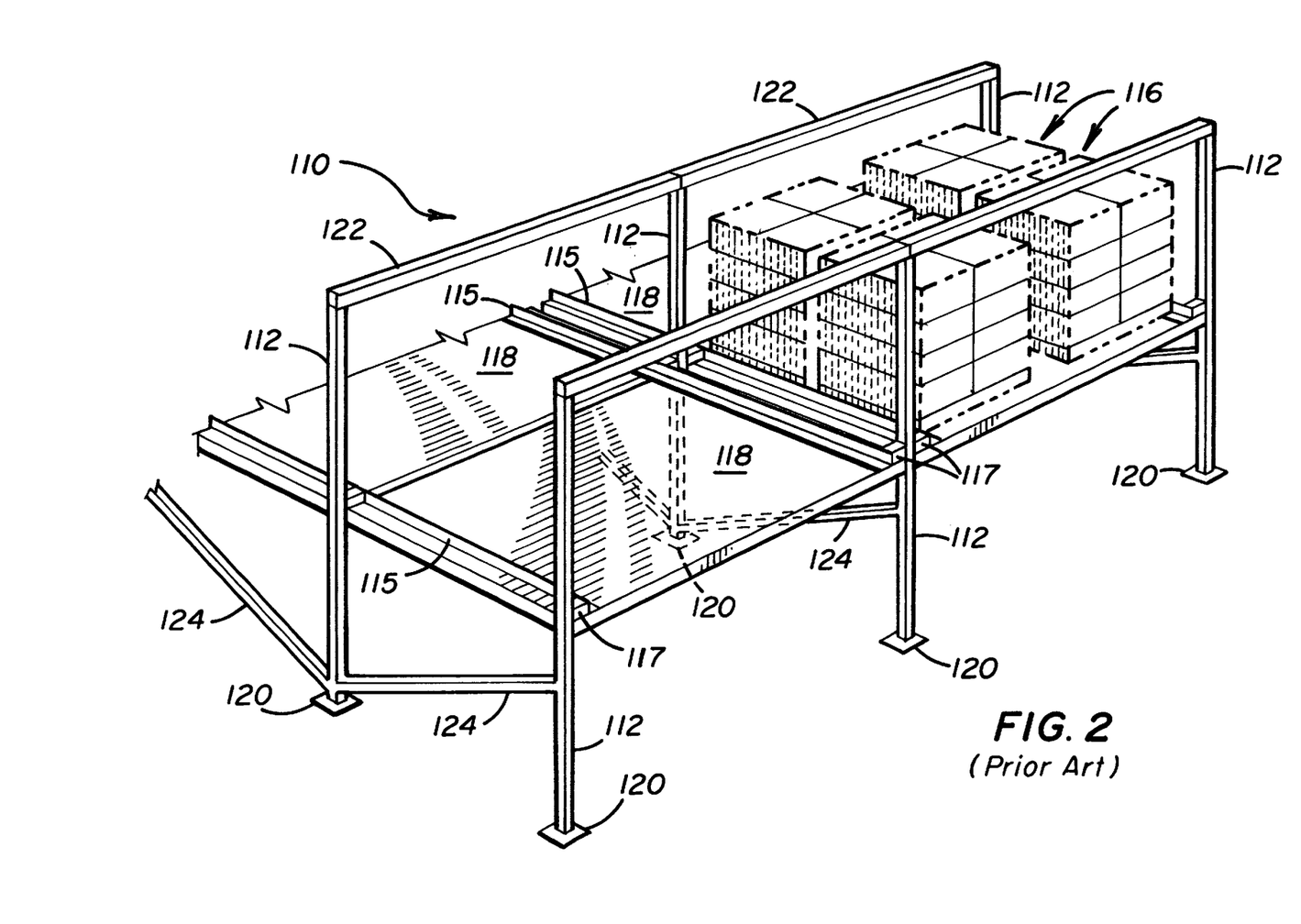
FIG. 2 is a perspective view of a dual pallet platform racking system.

FIGS. 1 and 2 depict examples of typical pre-existing pallet racking systems. The racking system 10 of FIG. 1, known as a single-width drive-through racking system, comprises a grid of upright posts 12 which serves as its frame. Pairs of single pallet cantilevered support means 14, e.g. 14A and 14B, are mounted upon opposing posts 12 such that palletized cartons 16 can be stored thereon and thereunder. Each palletized carton 16 may be guided onto racking system 10 by pallet guiding means such as L-shaped metal supports 18, which may also provide additional support for the palletized carton 16. L-shaped metal supports 18 may be maintained in proper position in relation to posts 12 using row spacers 17, which may simply be blocks fixed upon each cantilevered support means. Posts 12 are spaced apart from each other such that pallet storage spaces sized for storage of a single palletized carton 16 are defined above and below each cantilevered support means 14. The posts of such a single-width drive-through racking system are commonly secured to the floor by foot plates 20. For stability, the posts may be secured together with means such as top ties 22 and diagonal braces 24.

FIG. 2 depicts a typical double pallet platform racking system 110. Racking system 110 utilizes a grid of upright posts 112 spaced apart such that two palletized cartons 116 may pass between each two successive posts 112 of each row of the grid. Supporting sheets 118 are mounted in cantilevered fashion from groups of four posts 112 such that pairs of palletized cartons 116 may be stored thereon or thereunder. In some systems, called pushback racking systems, sheets 118 are replaced with sets of horizontally disposed rollers (not shown) onto which palletized cartons 116 may be rolled. Pallet guiding means such as L-shaped metal supports 115 may also be used in racking system 110, and may be properly positioned using row spacers 117. Similarly, the posts 112 of racking system 110 are typically secured to the floor by foot plates 120, and to each other by double-width top ties 122 and diagonal braces 124.

Figure 3:
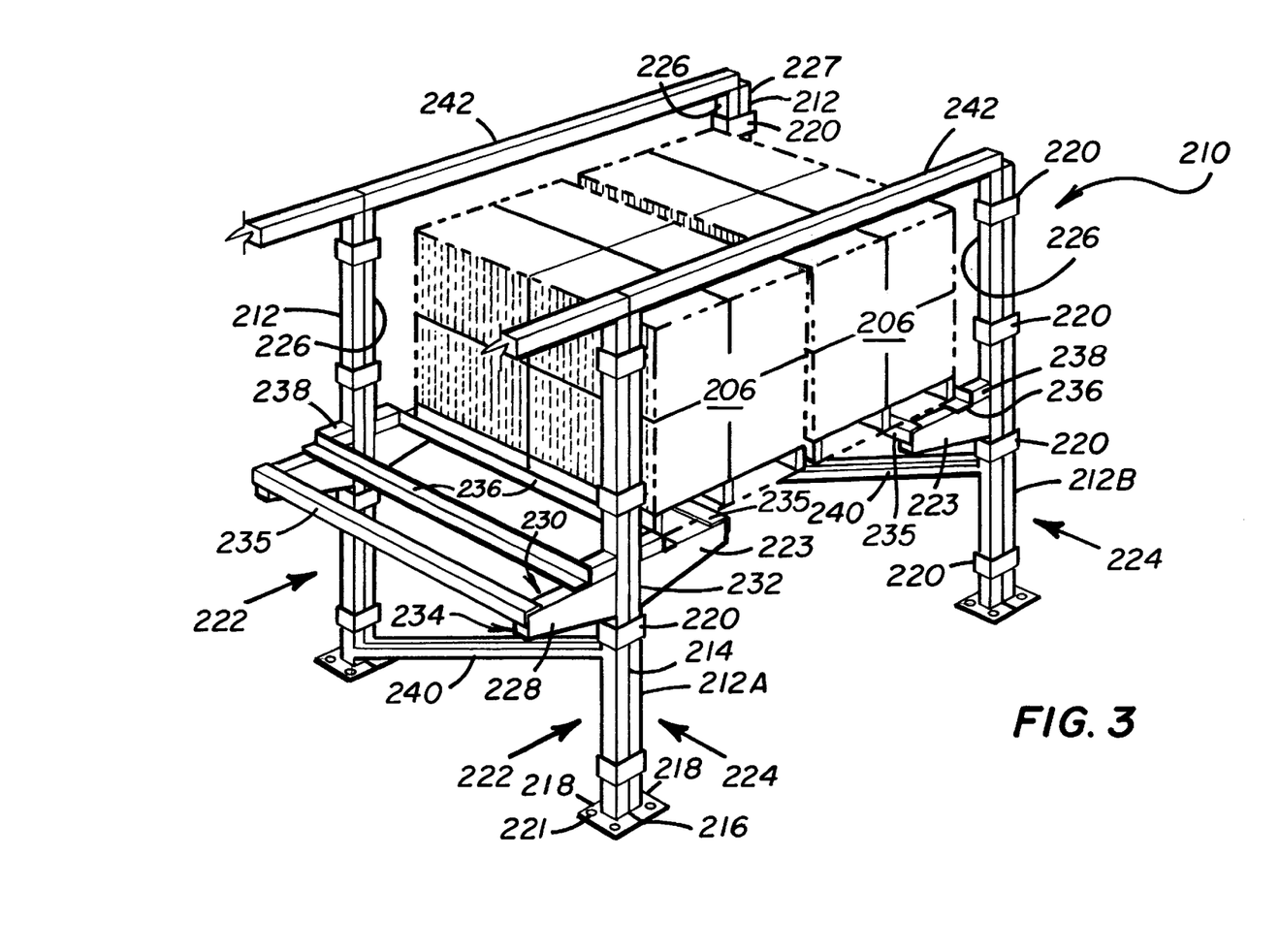
FIG. 3 is a perspective view of a dual pallet, vehicle-loadable racking system constructed by the inventive method, having two pallets stored in a front middle storage compartment.

The inventive method takes elements from existing racking systems such as racking system 10 and racking system 110 and uses them in creating a sophisticated double pallet, vehicle loadable racking system 210, depicted in FIG. 3. While the above examples are intended to describe typical existing racking systems which may be converted using the inventive method, it should be understood that the pre-existing racking systems need not be designed for storage of palletized cartons, and can employ different numbers of rows and columns of posts than desired for the new racking system. The existing racking system simply should employ multiple upright posts of suitable height to secure multi-level racking support elements thereon.

Figures 4, 4A, 4B, 4C, 5, 6:
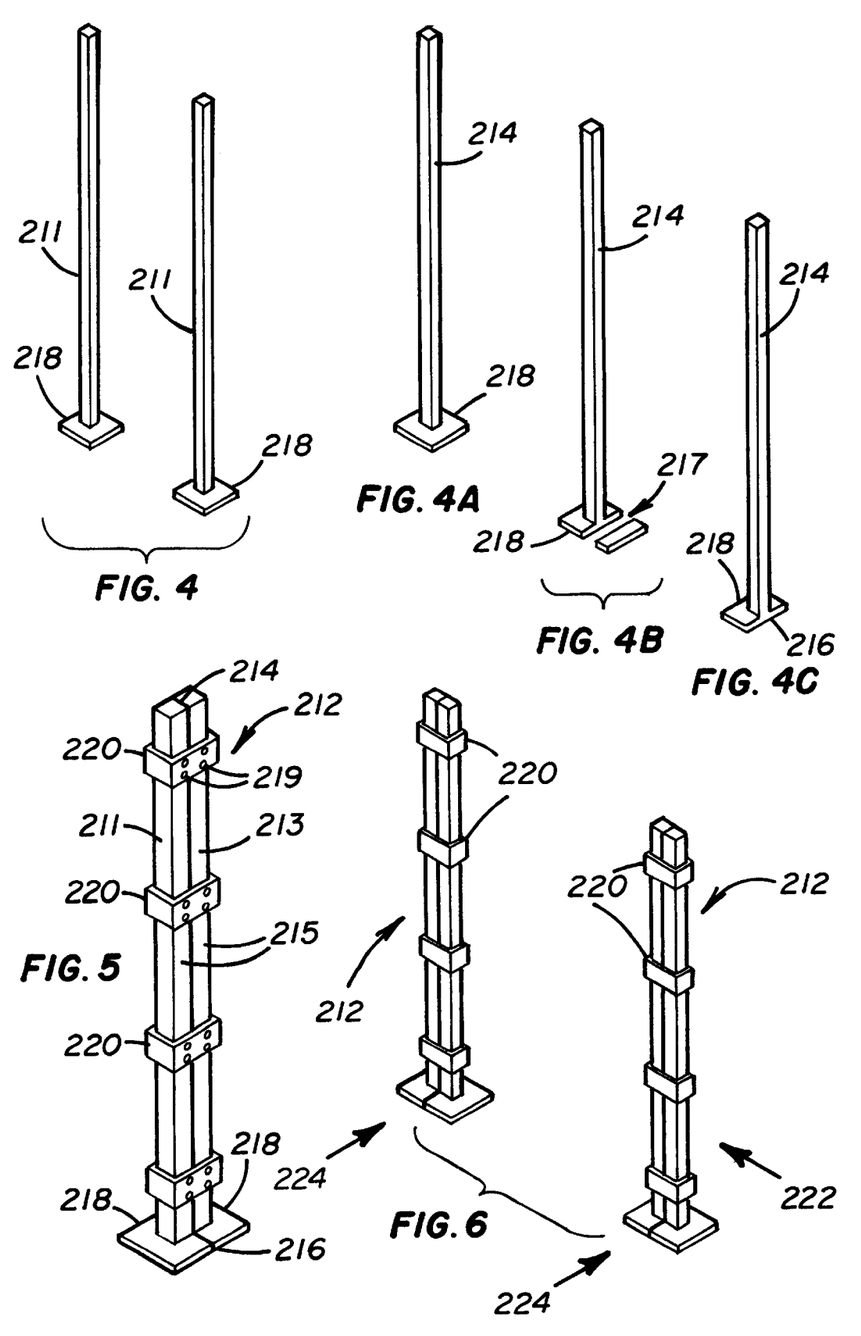
FIG. 4 is front view of primary upright posts isolated in an embodiment of the inventive method.
FIGS. 4A–4C are front views of upright posts showing the steps for cutting of the base members in an embodiment of the inventive method.
FIG. 5 is a front view of a bound upright post.
FIG. 6 is a front view of two bound upright posts formed into a grid structure.

With reference to FIG. 3, to construct the double pallet, vehicle loadable racking system 210, the inventive method follows the following steps, depicted in FIGS. 4–11. Referring to FIG. 4, a plurality of primary upright posts 211 are isolated from the pre-existing racking system. It should be noted that isolating primary upright posts 211 does not necessarily require moving them from their position in the pre-existing racking system if they are already maintained in a proper grid form (described below). The primary upright posts 211 will typically be in correct position within a double pallet push back racking system 110, which is oriented towards storing pairs of palletized cartons, but not in a single-width drive-through racking system 10.

Referring to FIG. 5, each of the primary upright posts 211 is bound with a secondary upright post 213 to form a bound upright post 212. Each secondary upright post 213 should have roughly the same dimensions (i.e. height, width, breadth) as its corresponding primary upright post 211. The supplied secondary upright posts 213 may constitute additional upright posts isolated from the pre-existing racking system, or may be newly supplied posts not found in the pre-existing racking system. Re-use of additional upright posts from the pre-existing system will reduce the cost of adding new materials, and is preferred where the pre-existing racking system supplies sufficient posts to build a new racking system 210 of the desired size. Where a larger new racking system 210 is desired, the use of newly supplied upright posts is appropriate. Additionally, newly supplied support posts may offer advantages over older support posts; for example, they may be constructed from newly developed improved materials.

The binding of a primary 211 and secondary 213 upright post is preferably accomplished by choosing an inner edge 214 for both the primary 211 and the secondary 213 upright post, and mating the two posts 211 and 213 together such that their inner edges 214 adjoin each other, forming mated post pairs 215. However, the primary upright posts 211 and/or the secondary upright posts 213 may have base members 218 which would impede such mating. In that case, the base members are preferably modified according to the method shown in FIGS. 4A–4C. Once the desired inner edge 214 is chosen for the primary or secondary post, the base member 218 is cut at indicated point 217 to form a planar edge 216 which is flush with the inner edge 214. Once this is accomplished, primary 211 and secondary 213 upright posts may be mated together by mating both their inner edges 214 and the planar edges 216 of their base members 218. Note, however, that where the base member does not interfere with the mating of the primary and secondary upright posts 211 and 213, no modification of the base member is necessary.

After the mated post pairs 215 have been formed, they are preferably bound together by fitting at least one tie plate 220 around both posts 211 and 213 of the pair. The location at which each tie plate 220 should be fitted should be chosen for its reinforcing strength. In a preferred embodiment, four tie plates 220 are spaced along the length of each post pair 215 as depicted in FIGS. 3 and 5. Each tie plate 220 can then be secured about the mated post pair by fastening bolts 219 through the tie plate 220 and into the posts 211 and 213 forming the mated post pair 215.

It is recommended that at least two bolts 219 pass through each tie plate 220 into each post 211 and 213, as shown in FIG. 5. These doubled, bound upright posts 212 provide increased structural strength to the new racking system 210, allowing the new racking system 210 to meet stringent safety standards.

Referring to FIGS. 3 and 6, the bound upright posts 212 should then be formed into a grid structure comprising at least one row 222 and at least two columns 224. Each column will define at least one interior side edge 226 that faces the bound upright posts of another column. Further rows 222 and/or columns 224 may be formed as desired depending upon the number of bound upright posts 211 and 213 which are available and upon the storage requirements for the new racking system 210. Preferably, each row is parallel to each other row and each column is parallel to each other column, with the rows and columns perpendicular to each other. FIG. 3 shows an embodiment of racking system 210 using a grid having two parallel rows 222 and two parallel columns 224.

The terms "row" and "column" used herein are used only for convenience, to describe the locations of posts relative to each other. In practice, the terms may be interchangeable as long as they are used consistently within a single racking system.

Figure 3A:
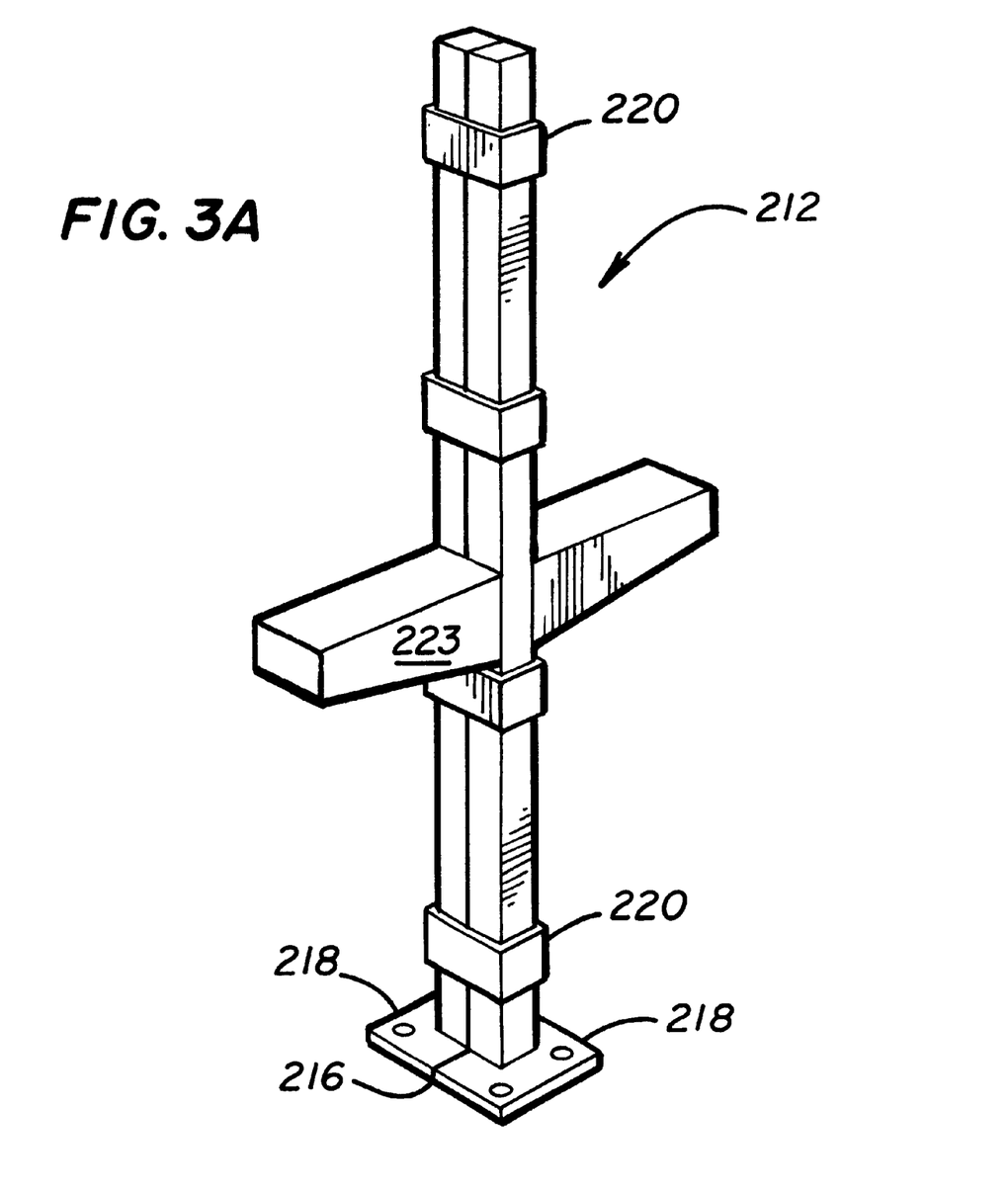
FIGS. 3A–3B are a perspective view of an alternative configuration of the bound upright posts used in the dual pallet, vehicle-loadable racking system constructed by the inventive method.

Note that because bound upright posts 212 are formed from two smaller upright posts 211 and 213, each of which typically has sides of equal width, each bound upright post 212 will typically have one side double the width of its other side. In forming the grid, it is not critical whether the bound upright posts 212 are oriented so that the longer side faces frontally, as in FIGS. 3 and 5–11, or faces the side, as shown in FIG. 3A, although preferably the orientations of all the bound upright posts 212 are consistent. One orientation may be preferred over the other in certain circumstances such as those described below.

Referring again to FIGS. 3 and 6, in the grid, each two successive bound upright posts 212 of each row 222 should be spaced apart sufficiently to accommodate the entrance of the body of a vehicle used to place pallets within the racking system 210, such as a lift truck. That distance should also be sufficient to allow a pair of palletized cartons 206 to be placed between the successive bound upright posts 212. If the grid formed utilizes multiple rows 222, then each two successive bound upright posts 212 of each column 224 should be spaced apart sufficiently that a palletized carton 206 can be accommodated between them.

As was noted above, where the primary upright posts 211 were already maintained in a grid form having the proper spacing in the pre-existing racking system, the primary upright posts 211 may be maintained in those positions while they are bound to the secondary upright posts 213. If this is done, the grid should be considered formed as soon as the binding of the primary 211 and secondary 213 upright posts is completed. It may be preferable to position the secondary upright posts 213 in front of or behind the primary upright posts 211, as shown in FIG. 3A, so that the addition of the secondary posts does not interfere with the entrance of the body of the lift truck or of a pair of palletized cartons 206 between the bound upright posts 212 of each row.

Once the bound upright posts are placed in the correct positions in the grid, they are preferably fastened in place. Referring to FIG. 3, this may be accomplished by fastening bolt members 221 through the mated base members 218 of the bound upright posts 212 and into the floor.

Figure 3B:
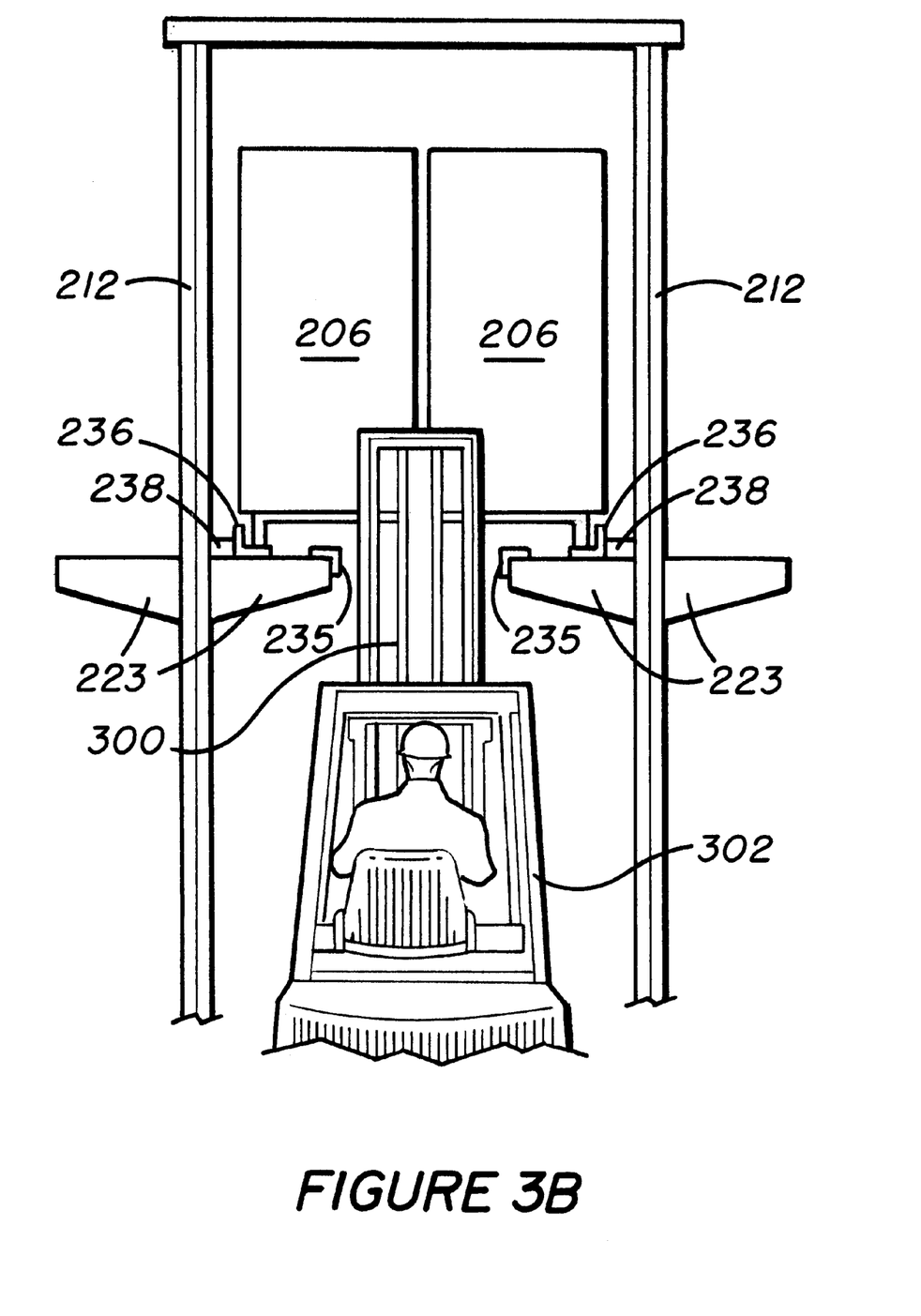

Once the grid structure is in place, a cantilevered support means 228 having an upper surface 230, an inner edge 232, and an outer edge 234, is attached to each interior side edge 226 of each column 224 at its inner edge 232. The cantilevered support means should have dimensions such that, once attached to opposing bound upright posts 212, such as 212A and 212B, the outer edges 234 of each two opposing cantilevered support means 228 are separated from each other sufficiently to accommodate an extendable mast 300 of a loading vehicle such as a lift truck 302 (See FIG. 3B) between them. That separation, however, should not be greater than the width of two palletized cartons 206. The cantilevered support means 228 should be placed at a point along the height of the bound upright posts 212 such that sufficient space is left below each cantilevered support means 228 to allow passage of the body of the loading vehicle and placement of a palletized carton 206 thereunder. The upper surfaces 230 of each two opposing cantilevered support means 228 should be coplanar. If different height levels for storage are desired between different columns of the grid, the upper surfaces 230 of non-opposing cantilevered support means 228 need not be coplanar.

It should be noted that the leftmost cantilevered support means 228 of FIG. 3 is shown assuming that a third upright post 212, not shown, is used in each row 222 to the left. Where there is no opposing upright post, the column defines an exterior side edge 227 rather than an interior side edge 226. Preferably nothing is mounted upon exterior side edges 227.

In a preferred embodiment, the cantilevered support means 228 attached to the inner side edge of each column 224 comprises one support arm 223 mounted upon each of the bound upright posts 112 forming the column 224. Note that if there is only one row 222 in the grid only one support arm 223 will be used. Where a single cantilevered support means 228 such as support arm 223 has insufficient dimensions to support a palletized carton 206, at least two rows 222 should be used in the grid.

Preferably, the support arms 223 used should have a depth equal to the length of the side of the bound upright post 212 to which it is attached. Accordingly, if the longer side of the bound upright posts 212 face frontally, as in FIGS. 3 and 5–11, support arms 223 attached to the bound upright posts 212 would have a depth equal to the length of the shorter sides of the bound upright posts 212. Alternatively, if the longer side of the bound upright posts 212 face the side, support arms 223 attached to the bound upright posts 212 should then have a depth equal to the length of the longer side of the bound upright posts 212.

Figure 9:
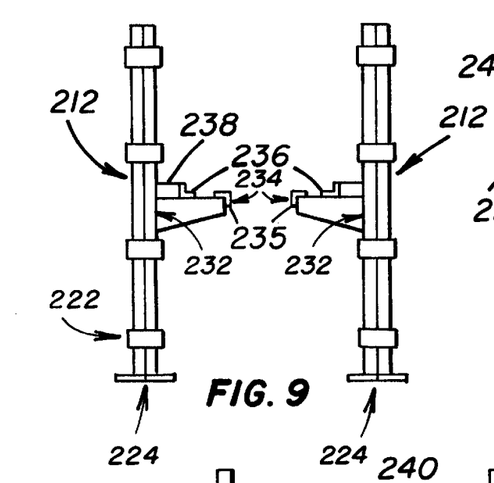
FIG. 9 is a front view of the two bound upright posts of FIG. 8 with pallet guiding means mounted upon each cantilevered support means.

Referring to FIG. 9, a preferred further step is then to mount outer and inner pallet guiding means 235 and 236 atop each cantilevered support means 228. Pallet guiding means 235 and 236 are mounted such that each parallels the column 224 to which its cantilevered support means 228 is attached. Referring to FIGS. 3 and 9, each outer pallet guiding means 235 is preferably positioned at the outer edge 234 of its cantilevered support means 228 and serves to support the palletized cartons 206 and guide the extendable mast 300 of the loading truck 302 between cantilevered support means 228. Each inner guiding means 236 is preferably separated from the inner edge 232 of its cantilevered support means 228 by a sufficient distance such that a palletized carton 206 guided between the pallet guiding means 236 will not accidentally strike the bound upright posts 212. Opposing inner pallet guiding means 236 are preferably separated from each other by a distance which is roughly equal to the width of two palletized cartons 206, such that the inner pallet guiding means 236 can be used for further support of the palletized cartons 206. Note that if pallet guiding means 235 or 236 of the appropriate length are used in the pre-existing racking system, as may be used in either the single-width drive-through racking system 10 or the double pallet push back racking system 110, they are preferably isolated from the pre-existing system and used as the pallet guiding means 236 in the new racking system 210. In a preferred embodiment, the pallet guiding means 235 and 236 are L-shaped metal supports, as shown in FIGS. 3 and 9.

Figures 7, 8:
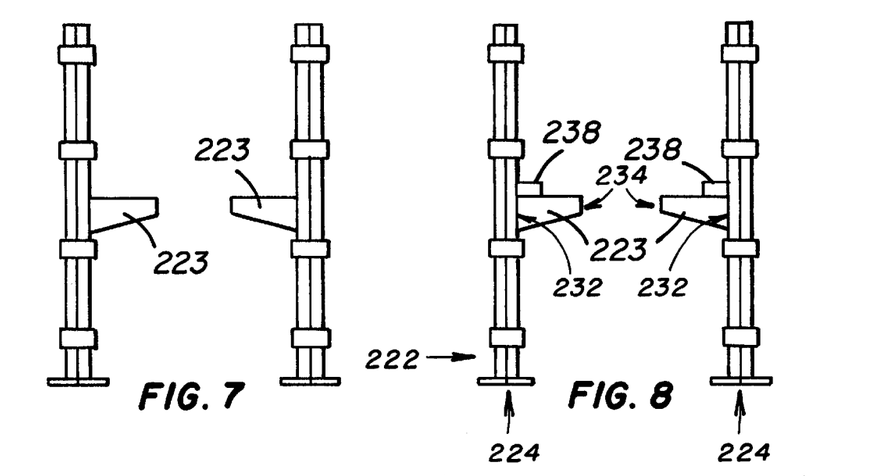
FIG. 7 is a front view of the two bound upright posts of FIG. 6 with attached cantilevered support means.
FIG. 8 is a front view of the two bound upright posts of FIG. 7 with row spacers fixed to each cantilevered support means.

Referring to FIGS. 3 and 8, if inner pallet guiding means 236 are to be positioned separated from the inner edge 232 of each cantilevered support means 228, a row spacer 238 is preferably fixed to each cantilevered support means 228 against its inner edge 232, having a width equal to the desired distance of separation between the inner pallet guiding means 236 and the inner edge 232, thus maintaining the pallet guiding means 236 in the correct position. If such a row spacer 238 is used, it is preferably fixed to the cantilever support means 228 before the inner pallet guiding means 236 is mounted, thus helping to correctly position the pallet guiding means 236. Suitable embodiments of row spacer 238 include, but are not limited to, individual elements mounted upon each such support arm 223, as shown, or elongated elements extending in parallel to L-shaped metal supports 236. Note that if row spacers 238 are used in the pre-existing racking system, as may be used in either the single-width drive-through racking system 10 or the double pallet push back racking system 110, they are preferably isolated from the pre-existing racking system and used in the new racking system 210.

It should be noted that multiple cantilevered support means 228, with corresponding pallet guiding means 235 and 236 and row spacers 238 as desired, could be mounted upon each column 224 of the grid, unless prohibited by the height of the pre-existing upright posts 211 and 213 or the structural strength of the new racking system 210. If additional vertical levels are so employed, each set of cantilevered support means 228 on each column 224 should be separated vertically by a distance sufficient to accommodate a palletized carton 206 therebetween.

Figure 10:
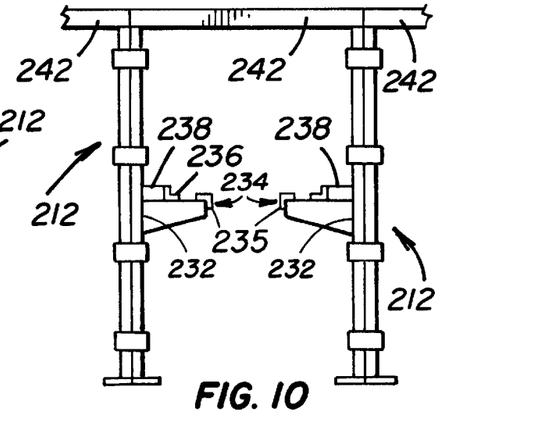
FIG. 10 is a front view of the two bound upright posts of FIG. 9 with a top ties mounted upon the posts.
Figure 11:
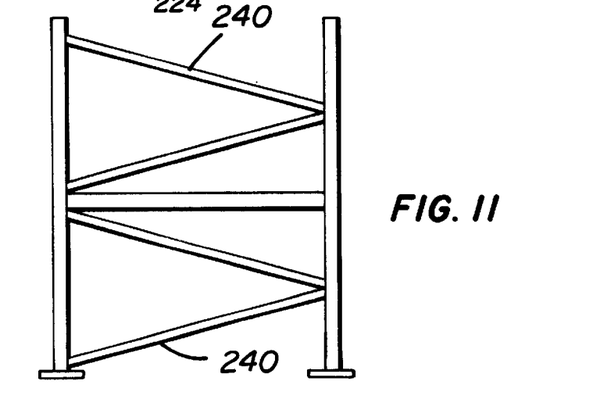
FIG. 11 is a side view of two rows of the grid of bound upright posts formed according to an embodiment of the inventive method wherein diagonal braces are fixed between the bound upright posts of each column.

Preferably, the successive bound upright posts 112 of each row and/or column are tied together for strengthened support. Referring to FIGS. 3 and 10, double-pallet top ties 242 may be secured between the top ends of successive bound upright posts of each row 222. To accommodate other top ties 242 which may be added to extend out to other bound upright posts 212 (not shown), the top ties 242 are preferably mounted such that their ends extend only halfway across the top of the bound upright posts 212. Further, if multiple rows 222 are used within the grid, diagonally oriented braces 240 may be used to secure successive bound upright posts 212 of each column 224 together. Many orientations of the diagonal braces 240 are possible: such braces can be used only at the lower level of the new racking system, as shown in FIG. 3, or along the entire height of the bound upright posts 212, as shown in FIG. 11. Preferably the orientation of the diagonal braces 240 is chosen to provide the greatest amount of structural support for the number of diagonal braces 240 available for use. Again, if diagonal braces or double-pallet top ties of the appropriate length for the dimensions of the new racking system are used in the pre-existing racking system, they are preferably isolated from the pre-existing racking system and used in the new racking system 210. Note that single-width drive-through racking systems may use suitable diagonal braces but will rarely use suitable top ties, whereas double pallet push back racking systems 110 will frequently use both diagonal braces and double pallet top ties of suitable length.

The double pallet, vehicle loadable racking system 210 constructed according to the inventive method efficiently uses storage space by creating a vertical multi-level racking structure sized to house palletized cartons 206. The doubling of the posts 211 and 213 used to form the bound upright posts 212 strengthens the racking system to meet the highest structural safety standards. It further allows the user to load two palletized cartons 206 into each storage space at once using a standard lift truck 302 having an extendable mast 300. As shown in FIG. 3, palletized cartons 206 stored upon the cantilevered support arms 223 are maintained in position by opposing wedging forces created by gravity.

Although the foregoing invention has been described in some detail by way of illustration for purposes of clarity of understanding, it will be readily apparent to those of ordinary skill in the art in light of the teachings of this invention that certain changes and modifications may be made thereto without departing from the spirit or scope of the appended claims.

It is claimed:

1. A method for converting a pre-existing, pre-assembled racking system into a double pallet, vehicle-loadable racking system suitable for use with palletized cartons and a lift truck having a body and an extendable mast, said pre-existing, preassembled racking system comprising a plurality of primary upright posts assembled together to form a frame, one or more first structural members attached to one or more of said plurality of primary upright posts, said first structural member capable of supporting goods placed thereon, and one or more second structural members, each of said second structural members providing structural support for said frame, the method comprising the steps of:

isolating each of said primary upright posts from said pre-existing racking system, said step of isolating including the step of removing each of said structural members from said primary upright posts;

binding each of said primary upright posts to a secondary upright post to form a plurality of bound upright posts;

forming a grid of said bound upright posts, said grid having at least one row and at least two columns, such that each two successive bound upright posts of each said row are spaced apart sufficiently to accommodate the entrance of said body of said lift truck and placement of a pair of said palletized cartons therebetween, said grid defining at least one interior side edge for each said column; and attaching a cantilevered support means for supporting one or more palletized cartons to each interior side edge of each column, said cantilevered support means each having an upper surface and an outer edge, such that the outer edges of any two opposing cantilevered support means are laterally separated from each other sufficiently to accommodate the entrance of said extendable mast of said lift truck therebetween, sufficient space is left below each cantilevered support means to allow passage of said body of said lift truck and placement of one of said palletized cartons thereunder, and said upper surfaces of any two opposing cantilevered support means are coplanar.

2. The method of claim 1, wherein said secondary upright posts are selected from said primary upright posts, such that said step of binding each of said primary upright posts to a secondary upright post to form a plurality of bound upright posts comprises pairing each primary upright post with another primary upright post and binding them together.

3. The method of claim 2, wherein said primary and secondary upright posts each define an inner edge and have a base member having a planar edge which is flush with said inner edge, and wherein said step of binding each of said primary upright posts with a secondary upright post comprises the step of:

mating each primary upright post with a secondary upright post to form a mated post pair, by mating said inner edges of each primary and secondary upright post and said planar edges of the base members of each primary and secondary upright post.

4. The method of claim 3, wherein said step of binding each of said primary upright posts with a secondary upright post further comprises the step of:

securing at least one tie plate around each mated post pair such that said tie plate wraps around both said primary and secondary upright posts forming said mated post pair to hold the adjoining primary and secondary inner edges of the primary and secondary upright posts together.

5. The method of claim 4, wherein each said base member is cut to form said planar edge.

6. The method of claim 5, wherein each said cantilevered support means comprises a set of support arms wherein one said support arm is fixed to each of the bound upright posts of the column to which the cantilevered support means is attached.

7. The method of claim 6, wherein the bound upright posts of each column define a plane, wherein each cantilevered support means defines an inner edge at which said cantilevered support means is attached to the interior side edge of one of said columns, and further comprising the step of mounting an inner and an outer pallet guiding means to each cantilevered support means, such that a center line of each face of said inner and outer pallet guiding means parallels the plane of the column of bound upright posts to which the cantilevered support means is attached, each said outer pallet guiding means is positioned at said outer edge of its cantilevered support means, and each said inner pallet guiding means is separated from the inner edge of the cantilevered support means.

8. The method of claim 7, wherein said pre-existing racking system comprises said inner and said outer pallet guiding means, and further comprising the step of isolating said inner and said outer pallet guiding means from said pre-existing racking system before said step of mounting one of said pallet guiding means atop each of the cantilevered support means.

9. The method of claim 8 wherein each said inner and outer pallet guiding means is an L-shaped support.

10. The method of claim 9, further comprising the step of fixing a row spacer to each cantilevered support means between said inner pallet guiding means and the inner edge of the cantilevered support means, said row spacer having a width equal to the distance separating said L-shaped support from said inner edge of the cantilevered support means.

11. The method of claim 10, wherein said pre-existing racking system comprises said row spacers, and further comprising the step of isolating said row spacers from said pre-existing racking system before said step of fixing a row spacer to each cantilevered support means.

12. The method of claim 11, wherein said grid defines at least two rows, and further comprising the step of connecting each two successive bound upright posts of each of said columns with at least one diagonal brace.

13. The method of claim 12, further comprising the step of connecting each two successive bound upright posts of each of said rows with a double-pallet top tie.

14. The method of claim 13, wherein said pre-existing racking system is a single pallet racking system, wherein said first structural members comprise cantilevered support plates suitable for storing a single pallet thereon, and wherein said second structural members comprise metal supports, row spacers, top ties, and diagonal braces, and wherein said step of isolating said primary upright posts includes the steps of removing said metal supports, row spacers, cantilevered support plates, top ties, and diagonal braces from said primary upright posts.

15. The method of claim 13, wherein said pre-existing racking system comprises said double-pallet top ties, and further comprising the step of isolating said double-pallet top ties from said pre-existing racking system before said step of connecting each two successive mated post pairs of each of said rows with a double-pallet top tie.

* * * * *